United States Patent [19]

Passantino

[11] Patent Number: 5,653,133
[45] Date of Patent: Aug. 5, 1997

[54] STEERING WHEEL AND BRAKE LOCKING DEVICE FOR ROAD VEHICLES

[76] Inventor: Frank Passantino, 155-71 99th St., Howard Beach, N.Y. 11414

[21] Appl. No.: 543,655

[22] Filed: Oct. 16, 1995

[51] Int. Cl.$^6$ ............................................. E05B 65/12
[52] U.S. Cl. ........................................ 70/238; 70/227
[58] Field of Search ........................ 70/238, 237, 225, 70/226, 227, 228

[56] References Cited

U.S. PATENT DOCUMENTS

| | | | |
|---|---|---|---|
| 3,190,090 | 6/1965 | Zaidener | 70/238 |
| 3,550,409 | 12/1970 | Pariser | 70/238 |
| 3,690,131 | 9/1972 | Davis | 70/203 |
| 3,898,823 | 8/1975 | Ludeman | 70/200 |
| 3,990,280 | 11/1976 | Jahn | 70/238 |
| 4,076,095 | 2/1978 | Adamski | 180/114 |
| 4,333,326 | 6/1982 | Winters | 70/203 |
| 4,432,432 | 2/1984 | Martin | 180/287 |
| 4,696,172 | 9/1987 | Farrow | 70/238 |
| 4,699,238 | 10/1987 | Tamir | 180/287 |
| 4,730,467 | 3/1988 | Lebrecht | 70/25 |
| 4,961,331 | 10/1990 | Winner | 70/209 |
| 5,119,651 | 6/1992 | Yang | 70/209 |
| 5,181,404 | 1/1993 | Baker | 70/203 |
| 5,267,458 | 12/1993 | Heh | 70/238 |
| 5,275,030 | 1/1994 | Cole | 70/209 |
| 5,327,753 | 7/1994 | White | 70/209 |
| 5,345,796 | 9/1994 | Chieh et al. | 70/202 |
| 5,513,506 | 5/1996 | Ricalde | 70/209 |

*Primary Examiner*—Steven N. Meyers
*Assistant Examiner*—Donald J. Lecher
*Attorney, Agent, or Firm*—William Daniel Schmidt

[57] ABSTRACT

The present invention relates to an anti-theft device for vehicles having a steering wheel and a brake. The device disclosed comprises a brake guard movably mounted to a fixed portion of the brake, a lower elongated member which hooks on to the brake guard, an upper elongated member which is locked to the lower elongated member, a Y bar spaced a distance adaptable to be placed around the steering wheel and a locking bar and a claw member. When the device is secured with two padlocks movement, of the steering wheel and the brake pedal is prevented. In addition the air bag is prevented from theft.

6 Claims, 4 Drawing Sheets

STEERING WHEEL AND BRAKE LOCKING DEVICE FOR ROAD VEHICLES

BACKGROUND OF THE INVENTION

The present invention relates to anti-theft devices for vehicles, and more particularly to a locking device to prevent turning of the steering wheel and movement of the brake as a protection against car theft attempts.

Steering wheel arresting devices are well known in the art (ex. U.S. Pat. Nos. 3,550,409; 3,690,131; 4,432,432; 4,699,238; 5,119,651; 5,267,458; 5,275,030; and many others,) which are comprised of an extendible member with a locking device for setting the length and a pair of hooks. A lower hook adaptable to be fastened to a brake pedal, the upper hook adaptable to be fastened to the rim or one of the spokes of the steering wheel.

It has been established that these devices have problems of being easily defeated by simply bending down or cutting through the rim of the steering wheel or the brake pedal at one point, and thereby release the grip of the upper or lower hooks.

SUMMARY OF THE INVENTION

The present invention has been accomplished to eliminate the aforesaid problems. It is thus the major object of the invention to improve the steering wheel device in the above mentioned respected.

More particularly, the present invention provides a steering wheel locking device of the kind referred to that is adapted to arrest—not only the rim or a spoke of the wheel—but the central hub thereof.

It is still further object of the invention to provide a steering wheel-brake locking device that utilizes a brake guard that locks the brake and arrest movement of the brake.

It is still further object of the invention to provide a hub arresting member that also prevents the air bag located inside the central hub of the steering from being stolen.

It is still further object of the invention to provide a shrouded padlock especially suitable for its purpose as a part of the steering wheel locking device.

It is still further object of the invention to provide a steering wheel locking device made of from ½ inch to 1 inch in thickness tempered steel which resist cutting or sawing that is readily visible to possible thieves from outside the vehicle.

Accordingly, it is an object of the present invention to provide a road vehicle steering wheel and brake locking device made of from ½ inch to 1 inch in thickness of tempered steel that resists cutting or sawing. The device is comprised of a brake guard having a channel. The channel is manufactured according to each model of the vehicle and is adapted to be attached to a fixed portion of the brake pedal lever. The brake guard is movably mounted on a brake pedal rod and swings back and forth with the brake. The brake guard protects the brake pedal from being cut or sawed.

Another feature of the present invention is to provide a lower elongated member and an upper elongated member. The lower elongated member has a hooked end and a hollow end, the hooked end attaches to the brake guard, the hollow end has a matted hole adaptable to receive a lock hasp. The upper elongated member has an upper hook end and a plurality of cutouts disposed on the lower end. The hollow end of the lower elongated member is adaptable to receive the lower end of the upper elongated member. The plurality of cutouts disposed on the upper elongated member elongated member when aligned with the matted hole of the hollow end of the lower elongated member define a hasp receiving passage for a padlock or the like so that the upper elongated member can be adjusted in length for locking the device.

Yet another feature of the present invention is to provide a Y bar having a left arm and a right arm, each arm spaced a distance adaptable to be placed around a steering column, each arm has an eyelet. The device also has a locking bar having a flat head at a first end and a hole defined by the length era lock hasp at a second end. The locking bar is slidable mounted in the right and left eyelets of the Y bar. The upper hooked end of the upper elongated member hooks around the locking bar and when a padlock hasp is engaged in the hasp receiving passage of the hollow end of the lower elongated member the brake pedal is prevented from movement by the upper elongated member holding the lower elongated member in place, the lower elongated member holds the brake guard in a fixed position which prevents the brake pedal from movement and thus the vehicle from being stolen.

The device has yet another feature which is a claw member having a hooked end and a right, left and middle finger at a second end. The hooked end of the claw member is mounted on the locking bar, the right left and middle finger, are spaced about the hub and spokes of the steering wheel.

When the padlock or the like is engaged at the hole defined by the length of a lock hasp at a second end on the locking bar, the right, left and middle fingers prevent movement of the steering wheel and thus prevent theft of the vehicle. In addition, since movement of the hub of the steering wheel is prevented, theft of the air bag from the hub of the steering wheel is also prevented.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawing.

BRIEF LIST OF REFERENCE NUMERALS UTILIZED IN THE DRAWING

10—Anti-theft device 10
12—Claw member 12
12A—Hooked end of claw member 12A
12B—Bar portion of Claw member 12B
12C—Web portion of claw member 12C
12D—Right finger of claw member 12D
12E—Bend portion of right finger 12E
12F—Right eyelet of right finger 12F
12G—Middle finger of claw 12G
12H—Bend portion of middle finger 12H
12I—Left finger of claw 12I
12J—Bend portion of left finger 12J
12K—Left eyelet of left finger 12K
14—Locking bar 14
14A—Flat head of locking bar 14A
14B—Lock hasp hole 14B
16—Left side bar 16
16A—Left side bar bend 16A
16B—Hooked end of left side bar 16B
18—Right side bar 18
18A—Right side bar bend 18A 18B—Hooked end of right side bar 18B
20—Y Bar
20A—Left arm of Y bar 20A
20B—Left eyelet of Y bar 20B
20C—Right arm of Y bar 20C
20D—Right eyelet of Y bar 20D
22—Upper elongated member 22
22A—Upper hook end of upper elongated member 22A
22B—Plurality of cutouts 22B
22C—Lower end of upper elongated member 22C
24—Lower elongated member 24
24A—Hollow end of lower elongated member 24A
24B—Matted hole of lower elongated member 24B
24C—Hook end of lower elongated member 24C
26—Brake guard 26
26A—Upper hook end of brake guard 26A
26B—Lower bend of brake guard 26B
26C—Lower side hook of brake guard 26C
26D—Rear wall of brake guard 26D
26E—Front wall of brake guard
26F—Channel of brake guard
28—Brake rod 28
30—Brake lever 30
32—Brake pedal 32
34—Vehicle dash board 34
36—Steering wheel 36
38—Steering wheel central hub 38
40—Steering wheel spoke 40
42—Steering column 42
44—Left shrouded padlock 44
44A—Left shrouded padlock hasp 44A
46—Right shrouded padlock 46
46A—Right shrouded padlock hasp 46A

DETAILED DESCRIPTION OF THE PREFERRED EMBODIMENT

Figures 1A, 1B:
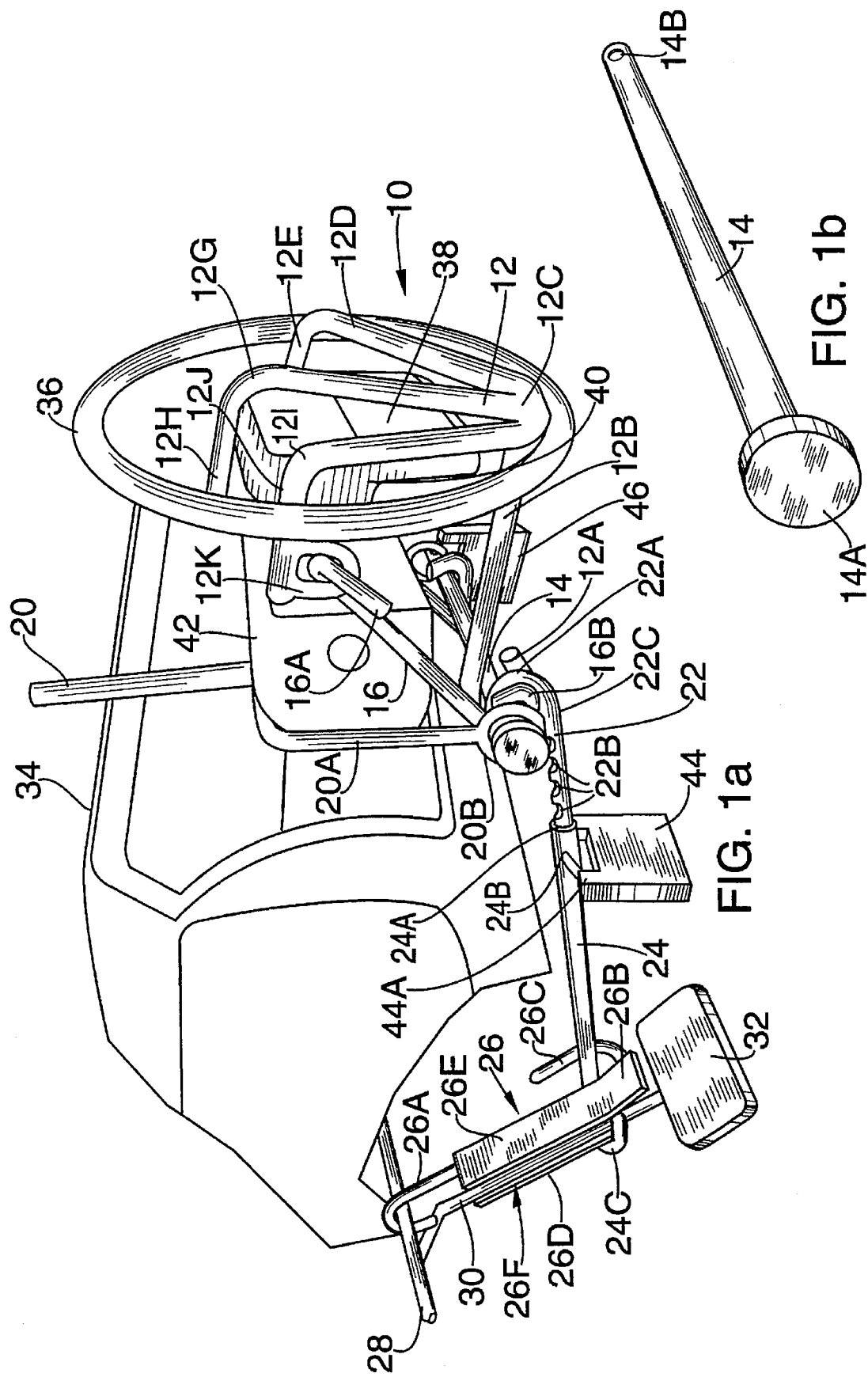
FIG. 1a is a side elevational view of the first preferred embodiment of the steering wheel and brake locking anti-theft device engaging and locking the steering wheel and brake of an automobile together.
FIG. 1b is a perspective view of the locking bar of the steering wheel and brake locking anti-theft device of the present invention.

Firstly, referring to FIG. 1a, which is a side elevational view of the first preferred embodiment of the steering wheel and brake locking anti-theft device, is generally designated by reference numeral 10. The device includes a claw member 12, a locking bar 14, a left side bar 16, a right side bar 18 in FIG. 2, a Y bar 20, an upper elongated member 22, a lower elongated member 24, and a brake guard 26 which at times are prevented from relative movement by left shrouded padlock 44, and right shrouded padlock 46.

Figure 3:
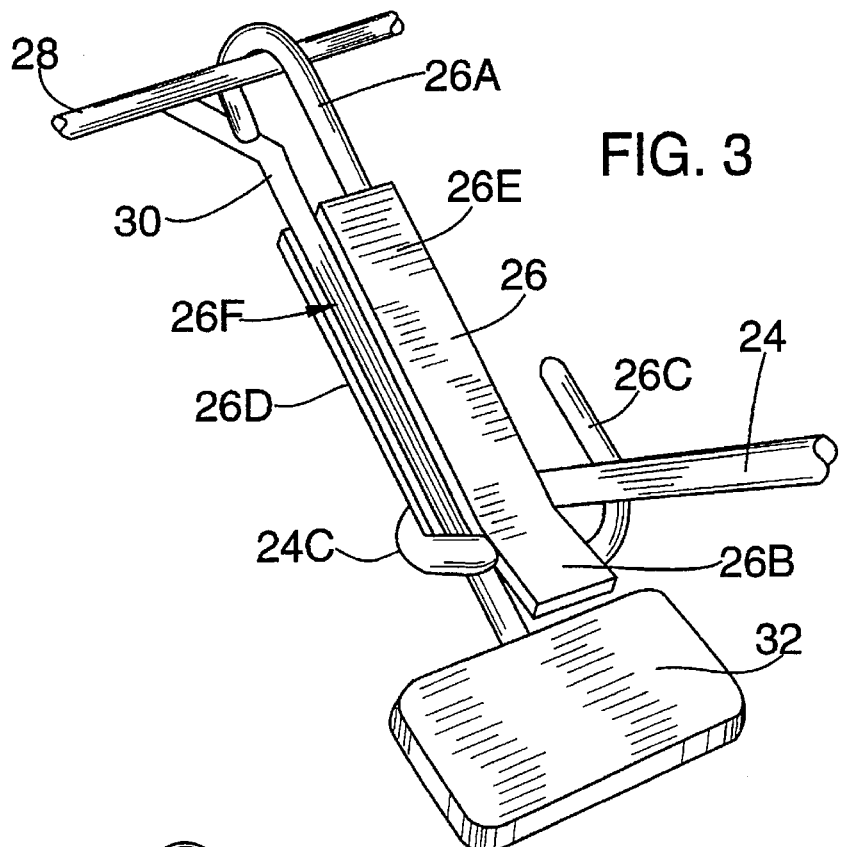
FIG. 3 is a top side view illustrating the brake guard of the present invention mounted on a brake lever.
Figure 4:
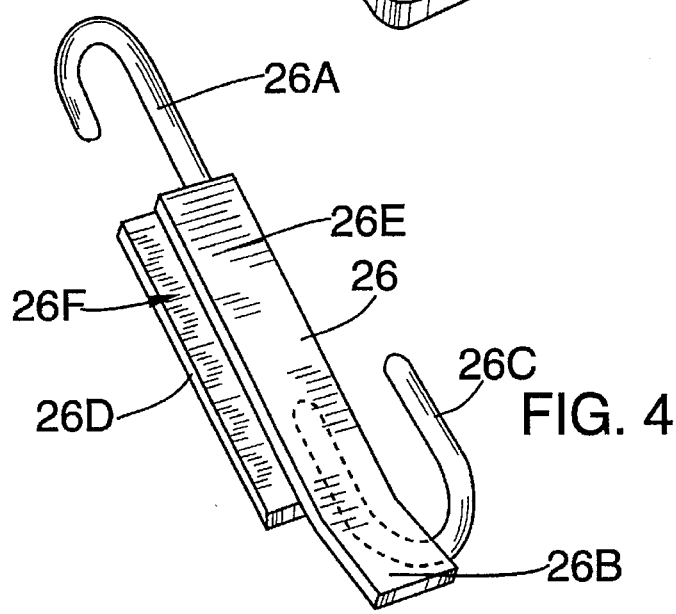
FIG. 4 is a partially sectional top view of the brake guard of the present invention.
Figure 5:
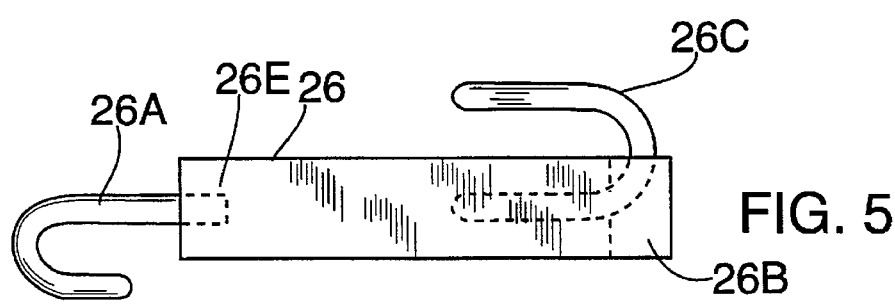
FIG. 5 is a horizontal plan view of the brake guard of the present invention.

Specifically the brake guard 26 illustrated in detail in FIG. 3–5, is provided with upper hook end 26A, a lower bend 26B, a lower side hook 26C, a rear wall 26D, a front wall 26E, the rear wall 26D and front wall 26E define a channel 26F. The upper hook end 26A, the lower hook end 26C, and the lower bend 26B are disposed on the front wall 26E. The upper hook end 26A is designed to be movably mounted to the brake pedal rod 28 so as to swing back and forth with the brake pedal 32. In the first and second preferred embodiment, the brake guard is attached by upper hook end 26A to the brake pedal rod 28, but any attachment means can be used depending on the type of vehicle. The channel 26F is adapted to be attached to a fixed portion of the brake pedal lever 30 as to tightly fit around the brake pedal lever 30. The brake guard lower bend is adapted to fit around the brake pedal 32 which may be manufactured according to different types of vehicles. It is understood that the brake guard 26 can be designed to fit around any vehicle pedal including the gas pedal. The lower side hook 26C of the brake guard is adapted to receive the hooked end of the lower elongated member 24 and keep the lower elongated member in a fixed position.

The lower elongated member 24 is provided with a hook end 24C, a hollow end 24A, and a matted hole 24B. The hook end 24C of the lower elongated member is a sufficient length to extend through the lower side hook 26C of the brake guard and then hook around the rear wall 26D of the brake guard. The hollow end 24A of lower elongated member has matted hole 24B disposed thereon. The matted hole 24B is of a sufficient diameter to receive a left shrouded padlock hasp 44A.

The upper elongated member 22 is provided with an upper hook end 22A, a lower end 22C and a plurality of cutouts 22B disposed on the lower end 22C of the upper elongated member. The hollow end 24A of the lower elongated member is of a sufficient diameter to slidably receive the lower end 22C of the upper elongated member. The plurality of cutouts 22B disposed on the lower end 22C of the upper elongated member when aligned with the matted hole 24B of the hollow end of the lower elongated member define a left shrouded padlock hasp 44A receiving passage for the shrouded padlock or the like.

Figure 2:
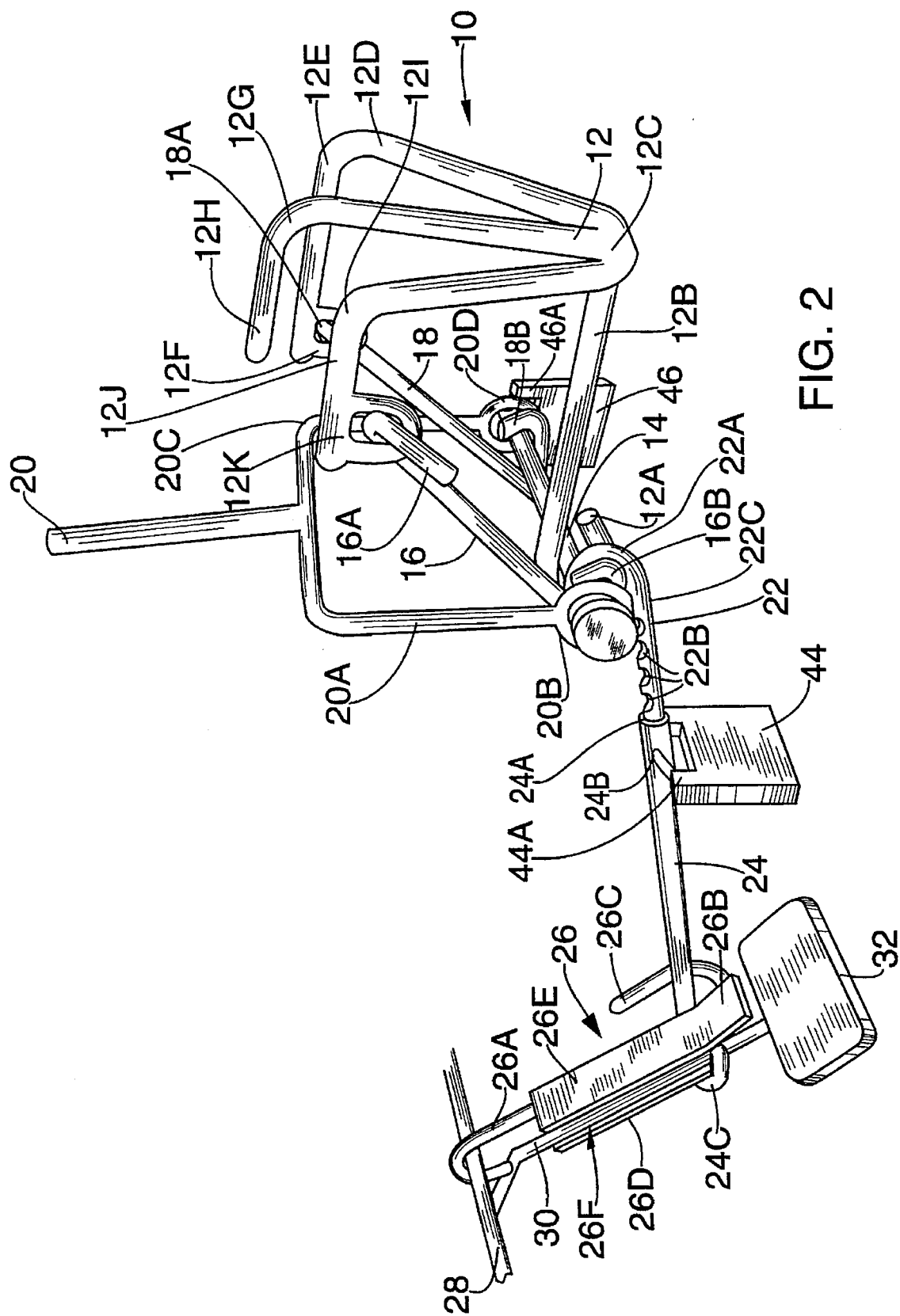
FIG. 2 is a left side view of the steering wheel and brake locking anti-theft device of the present invention engaging the brake of an automobile together.

The Y bar 20, is provided looking at FIG. 2, with left arm 20A, left eyelet 20B, right arm 20C and right eyelet 20D, each arm of the Y bar is spaced a distance adaptable to be placed around a steering column 42.

A locking bar 14 illustrated in FIG. 1b, is provided with a flat head 14A at a first end, and a second end having a hole 14B disposed thereon of a sufficient diameter to receive right shrouded padlock hasp. The second end of the locking bar 14B has a diameter less than the diameter of left eyelet 20B, and right eyelet 20D so that the second end of the locking bar 14B slides to a position past the right eyelet 20D so as to be adaptable to receive right shrouded padlock hasp. The flat head 14A is a larger diameter than left eyelet 20B, so as to hold the locking bar 14 in a fixed position. The upper hook end 22A of the upper elongated member is adaptable to be placed around locking bar 14, when the right shrouded padlock is locked at hole 14B, and left shrouded padlock hasp 44A is locked at matted hole 24B of the hollow end of the lower elongated member the relative movement of the brake lever 30 is prevented by the brake guard 26 being hooked to the lower elongated member 24 which is locked to the upper elongated member 22 by left shrouded padlock 44 and the upper hook end is adjusted around the locking bar. It will be understood that the locking bar may also have a lock integral with the locking bar.

The claw member 12 is provided with a hooked end 12A, a bar portion 12B and a web portion 12C. The hooked end 12A of the claw member 12 is adaptable to be placed around locking bar 14. The bar portion 12B of the claw member extends the web portion 12C a sufficient distance from the locking bar 14 to be placed around the steering wheel hub 38. The web potion 12C has a fight finger 12 D, a middle finger 12 G, and left finger 12I extending therefrom Each finger is adapted to fit around the steering wheel hub 38 and spokes 40 of the steering wheel. Right finger bend portion 12E surrounds the steering wheel spoke 40, middle finger bend portion 12 H surrounds steering wheel hub 38, and left finger bend portion 12I surrounds the steering wheel spoke 40 so that when the right shrouded padlock is locked at hole 14B of the locking bar, the right finger 12 D, left finger 12I tightly engaged the steering wheel spoke 40 preventing the relative movement thereof and the middle finger 12 G, tightly engages the steering wheel hub 38 preventing theft of the air bag and the relative movement thereof.

In the first preferred embodiment illustrated in FIG. 1a, left finger bend portion 12I is provided with a left finger eyelet 12K. Right finger bend portion 12E is provided with a right finger eyelet 12F, this is illustrated in FIG. 2.

A left side bar 16, is provided with a left side bar bend at one end 16A, and a left side bar hooked end 16B, the left side bar hooked end is adaptable to be hooked around locking bar 14. The left side bar bend 16A is adaptable to be hooked through left finger eyelet 12K, this provides further support to the claw member 12, and prevents movement of the steering wheel.

A fight side bar 18 illustrated in FIG. 2, is provided with a right side bar bend at one end 18A, and a right side bar hooked end 18B, the right side bar hooked end is adaptable to be hooked around locking bar 14. The right side bar bend 18 is adaptable to be hooked through right finger eyelet 12F, this provides further support to the claw member 12, and prevents movement of the steering wheel.

Figure 6:
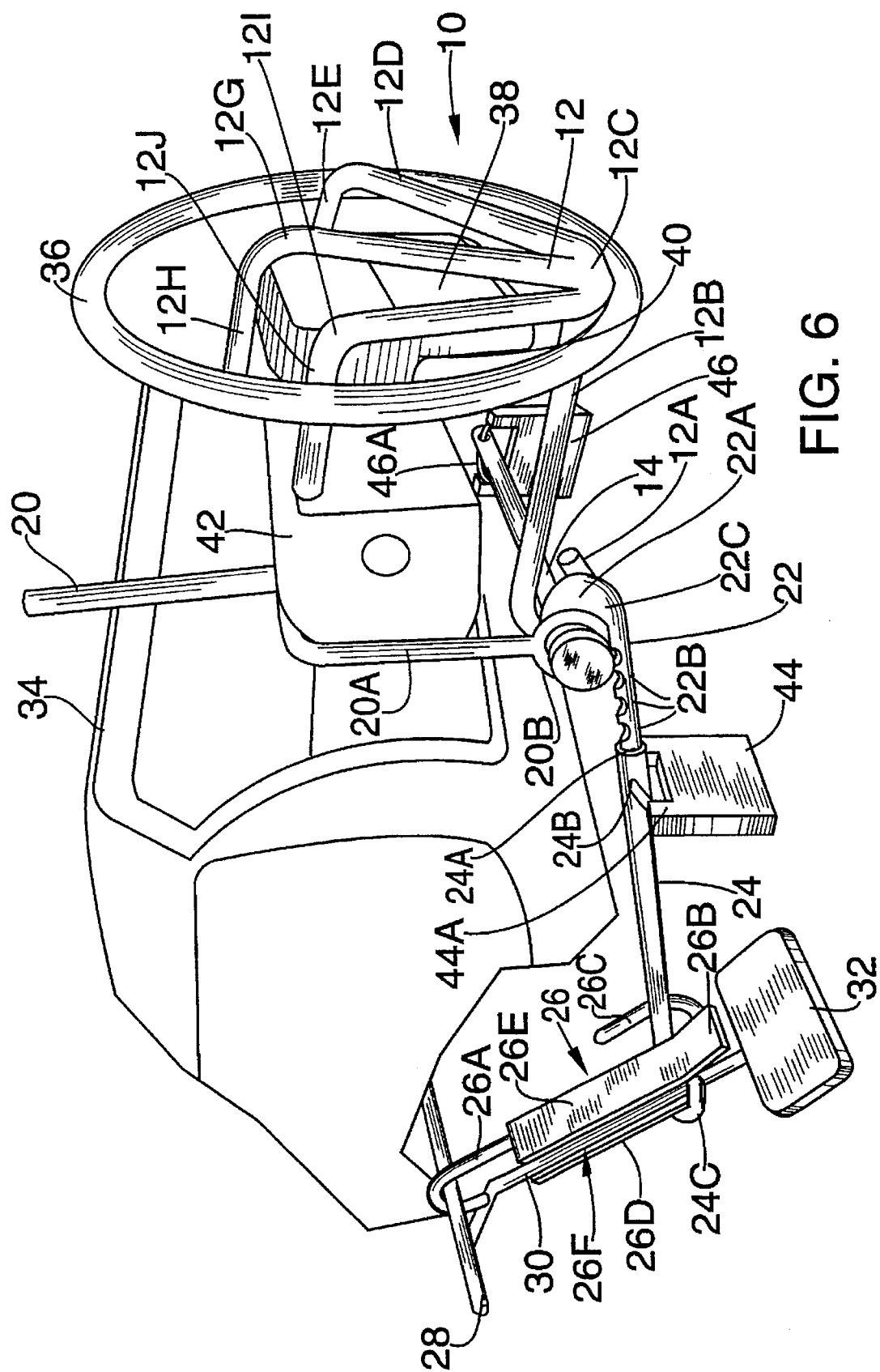
FIG. 6 is a side elevational view of the second preferred embodiment of the steering wheel and brake locking anti-theft device engaging and locking the steering wheel and brake of an automobile together.

FIG. 6 is an illustration of the second preferred embodiment without the right eyelet 12F of the right finger 12D of the claw member, and the left eyelet 12K of the left finger 12I of the claw member. Also, right side bar 18 and left side bar 16 are also not in the second preferred embodiment. The anti-theft device operates in the same manner as in the first preferred embodiment, engaging and locking the steering wheel and brake of an automobile together.

In use, the user will have installed or manually hook upper hook end 26A to brake pedal rod 28, the channel 26F is attached to a fixed portion of the brake pedal lever 30 as to tightly fit around the brake pedal lever 30. The brake guard swings back and forth with the brake until the lower elongated member 24 is hooked through the lower side hook 26C of the brake guard and is hooked around the rear wall 26D of the brake guard. The hollow end 24A of lower elongated member has matted hole 24B disposed thereon. The matted hole 24B is of a sufficient diameter to receive a left shrouded padlock hasp 44A. The upper elongated member 22 is placed inside the hollow end 24A of the lower elongated member. The Y bar 20, is placed around a steering column 42. The locking bar 14 is slid into left eyelet 20B, and right eyelet 20D, right shrouded padlock 46 is then locked at hole 14B. The upper hook end 22A of the upper elongated is then adjusted and hooked around locking bar 14. The upper hook end 22A is locked into place by left shrouded padlock 44, at the cutout 22B. This will prevent the relative movement of the brake lever 30 and thus prevent the theft of the vehicle.

If the user needs more protection of the vehicle from theft, the user can place the hooked end 12A of the claw member through the steering wheel, place hook end 16B of left side bar, the hooked end 12A of the claw member 12, and hooked end 18B of right side bar around locking bar 14. When right and left side bars are attached to their respective eyelets on the left linger 12K and the right finger 12F, the locking bar 14 is locked with right shrouded padlock 46, the steering wheel spoke 40, the steering wheel hub 38 are prevented from movement as well as the brake lever 30. In addition the air bag is prevented from theft by middle finger 12G of the claw.

All parts of the device are made of from ½ inch to 1 inch in thickness tempered steel to prevent sawing or cutting. The device may optionally may be chrome coated for aesthetic reasons and covered with a plastic or the like coating to prevent damage to the dash board 34 or steering column 42, or steering wheel 36.

It will be understood that each of the elements described above, or two or more together, may also find a useful application in other types of constructions differing from the type described above.

While the invention has been illustrated and described as embodied in an vehicle anti-theft device, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. An anti-theft device for vehicles having a steering wheel, said steering wheel having a central hub, a plurality of spokes, said steering wheel is mounted on a steering column and a brake having a brake pedal, a brake lever and a brake rod, comprising:

a brake guard, said brake guard having an upper hook end, a lower bend, a lower side hook, a rear wall, a front wall, said rear wall and said front wall define a channel, said upper hook end, said lower hook end, and the lower bend are disposed on said front wall, said upper hook end is designed to be movably mounted to the brake pedal rod so as to swing back and forth with the brake pedal, a lower elongated member having a hooked end and a hollow end, said hooked end adapted to be secured to said brake guard at said lower side hook of said brake guard, said hollow end adaptable to be locked in a fixed position, an upper elongated member having a lower end and an upper end, said lower end adaptable to be secured in said hollow end of said lower elongated member, a Y bar having a left arm and a right arm, each arm spaced a distance adaptable to be placed around the steering column, a locking bar adaptable to be mounted between each of said arms of said Y bar, said locking bar adapted to secure said upper end of said upper elongated member to said locking bar, a first lock adapted to secure said upper elongated member to said locking bar, a second lock adapted to secure said locking bar to said Y bar.

2. The anti-theft device of claim 1, wherein said locks are combination locks.

3. The anti-theft device of claim 1, wherein said locks are shrouded padlocks.

4. The anti-theft device of claim 1, wherein said anti-theft device is comprised of from ½ inch up to 1 inch in thickness of tempered steel.

5. An anti-theft device for vehicles having a steering wheel, said steering wheel having a central hub, a plurality of spokes, said central hub having an air bag, said steering wheel is mounted on a steering column and a brake having a brake pedal, a brake lever and a brake rod, comprising:

a brake guard movably mounted to the brake, when said brake guard is locked movement of the brake is prevented, a lower elongated member having a hooked end and a hollow end, said hooked end adapted to be secured to said brake guard, said hollow end adaptable to be locked in a fixed position, an upper elongated member having a lower end and an upper end, said lower end adaptable to be secured in said hollow end of said lower elongated member, a Y bar having a left arm and a right arm, each arm spaced a distance adaptable to be placed around the steering column, a locking bar adaptable to be mounted between each of said arms of said Y bar said locking bar adapted to secure said upper end of said upper elongated member to said locking bar, a lock adapted to secure said upper elongated member to said locking bar, a claw member having a second end, a right finger, a middle finger, a left finger, a left side bar, a right side bar, said right finger, said middle finger and said left finger adapted to-be mounted between said spokes on said steering wheel, said left side bar adaptable to further secure said claw member to said locking bar, said right side bar adaptable to further secure said claw member to said locking bar said second end of said claw member adapted to be secured to said locking bar so that movement of the steering wheel and air bag is prevented.

6. The anti-theft device of claim 5, wherein said brake guard is comprised of an upper hook end, a lower bend, a lower side hook, a rear wall, a front wall, said rear wall and said front wall define a channel, said upper hook end, said lower hook end, and the lower bend are disposed on said front wall, a said upper hook end is designed to be movably mounted to the brake pedal rod so as to swing back and forth with the brake pedal, said lower side hook is adaptable to receive said lower elongated member.

* * * * *